(12) United States Patent
Agarwal et al.

(10) Patent No.: US 8,461,241 B2
(45) Date of Patent: Jun. 11, 2013

(54) AIR SPRINGS AND VULCANIZABLE COMPOSITIONS FOR PREPARING THE SAME

(75) Inventors: Sheel P. Agarwal, Stow, OH (US); Allen Powell, Akron, OH (US); Mary Ann Powell, legal representative, Akron, OH (US)

(73) Assignee: Firestone Building Products Co., LLC, Indianapolis, IN (US)

( * ) Notice: Subject to any disclaimer, the term of this patent is extended or adjusted under 35 U.S.C. 154(b) by 685 days.

(21) Appl. No.: 12/616,385

(22) Filed: Nov. 11, 2009

(65) Prior Publication Data

US 2010/0117274 A1  May 13, 2010

Related U.S. Application Data

(60) Provisional application No. 61/113,394, filed on Nov. 11, 2008.

(51) Int. Cl.
*C08K 5/10* (2006.01)
*F16F 9/04* (2006.01)

(52) U.S. Cl.
USPC .................................... 524/318; 267/64.27

(58) Field of Classification Search
USPC ............................................. 524/318
See application file for complete search history.

(56) References Cited

U.S. PATENT DOCUMENTS

| 5,527,170 A | 6/1996 | Graves et al. |
| 6,439,550 B1 | 8/2002 | Koch |
| 7,250,203 B2 | 7/2007 | Kerstetter, III et al. |
| 2004/0198876 A1 | 10/2004 | Shiraishi et al. |
| 2007/0135010 A1 * | 6/2007 | Chu et al. ............ 442/394 |
| 2008/0111288 A1 | 5/2008 | Howard et al. |

FOREIGN PATENT DOCUMENTS

JP   11-181308 A   7/1999

OTHER PUBLICATIONS

European Search Report dated Jun. 30, 2011 for Eur. Appl. No. EP09175659; 5 pages; Eur. Appl. No. EP09175659 is INPADOC family member of subject U.S. Appl. No. 12/616,385.

* cited by examiner

*Primary Examiner* — Hui Chin
(74) *Attorney, Agent, or Firm* — Jason A. Houser; Arthur M. Reginelli

(57) ABSTRACT

An air spring having an airsleeve, wherein at least one layer of said airsleeve includes the vulcanization product of a vulcanizable composition including an elastomer and a non-ionic surfactant.

11 Claims, 3 Drawing Sheets

AIR SPRINGS AND VULCANIZABLE COMPOSITIONS FOR PREPARING THE SAME

This Application claims the benefit of U.S. Provisional Ser. No. 61/113,394, filed on Nov. 11, 2008, which is incorporated herein by reference.

TECHNICAL FIELD

Embodiments of the present invention relate to vehicle air springs and elastomeric compositions for making the same.

BACKGROUND

Air springs, or pneumatic suspension devices, have long been used to isolate road disturbances from a vehicle, seat, or cab. An air spring, as part of a vehicle's suspension can support the vehicle's load or mass at each axle. Typically, each axle of a vehicle associated with an air spring supports the mass component or load carried by the axle. In addition, there may be ancillary air springs that support driver comfort in and around the driver's compartment, or cab. In an air spring, a volume of gas, usually air, is confined within a flexible container. As an air spring is compressed (jounce travel), the pressure of the gas within the air spring increases; and as an air spring extends (rebound travel), the pressure of the gas within the air spring decreases. Road disturbances are mainly absorbed by this compression and extension of the air springs as a function of work ($w=\int F \cdot dx$). Air springs are often engineered to have a specific spring rate or spring constant, thereby controlling jounce and rebound characteristics for the desired application and for comfort.

Because an air spring may undergo countless cycles between compression and extension, the air spring must include an enclosure container for the gas that is flexible and durable. Typically, these enclosures are referred to as bellows or airsleeves and include one or more components that are made of cord-reinforced (fabric or metal) rubber compositions. Cord-fabric may be, but is not limited to, natural or synthetic materials.

Over time and under operational stresses, the material properties of airsleeves can change. Eventually, cracks may form and become sufficiently large to require replacement of the sleeve. Thus, there is a need for an air spring with an airsleeve having improved resistance to cracking.

SUMMARY OF THE INVENTION

In one or more embodiments, the present invention provides an air spring having an airsleeve, wherein at least one layer of said airsleeve includes the vulcanization product of a vulcanizable composition including an elastomer and a non-ionic surfactant.

In one or more embodiments, the present invention provides a method for the production of an air spring airsleeve comprising mixing a rubber, non-ionic surfactant, and a curative to form a green compound, forming the green compound into the shape of an airsleeve, and curing the green compound.

In one or more embodiments, the present invention provides an air spring having an airsleeve, wherein at least one layer of said airsleeve has a rubber component comprised of an elastomer and a non-ionic surfactant.

DETAILED DESCRIPTION OF ILLUSTRATIVE EMBODIMENTS

Embodiments of the present invention are directed toward air suspension systems, which may include an air spring and a pump for delivering air pressure to the air spring. The air springs may include an air sleeve (also known as a bellow), a piston, a bead plate, and fittings. The air sleeve may include a rubber laminate including multiple rubber sheets laminated to one another. In one or more embodiments, one or more of the rubber sheets may include reinforcing cords, such as fiber cords. In particular embodiments, the laminate includes two layers of fiber-reinforced rubber sheet, with the fibers of the individual layers being positioned at a bias with respect to each other; i.e., the fibers of the first layer are positions at a bias to the fibers of the second layer, where the fibers of the individual layers are positioned parallel to one another within the layer. Other layers of the laminate may include a liner, which the fiber-reinforced layers may overlay. Still other layers may include a cover, which may overlay the fiber-reinforced layer or layers.

Figure 1:
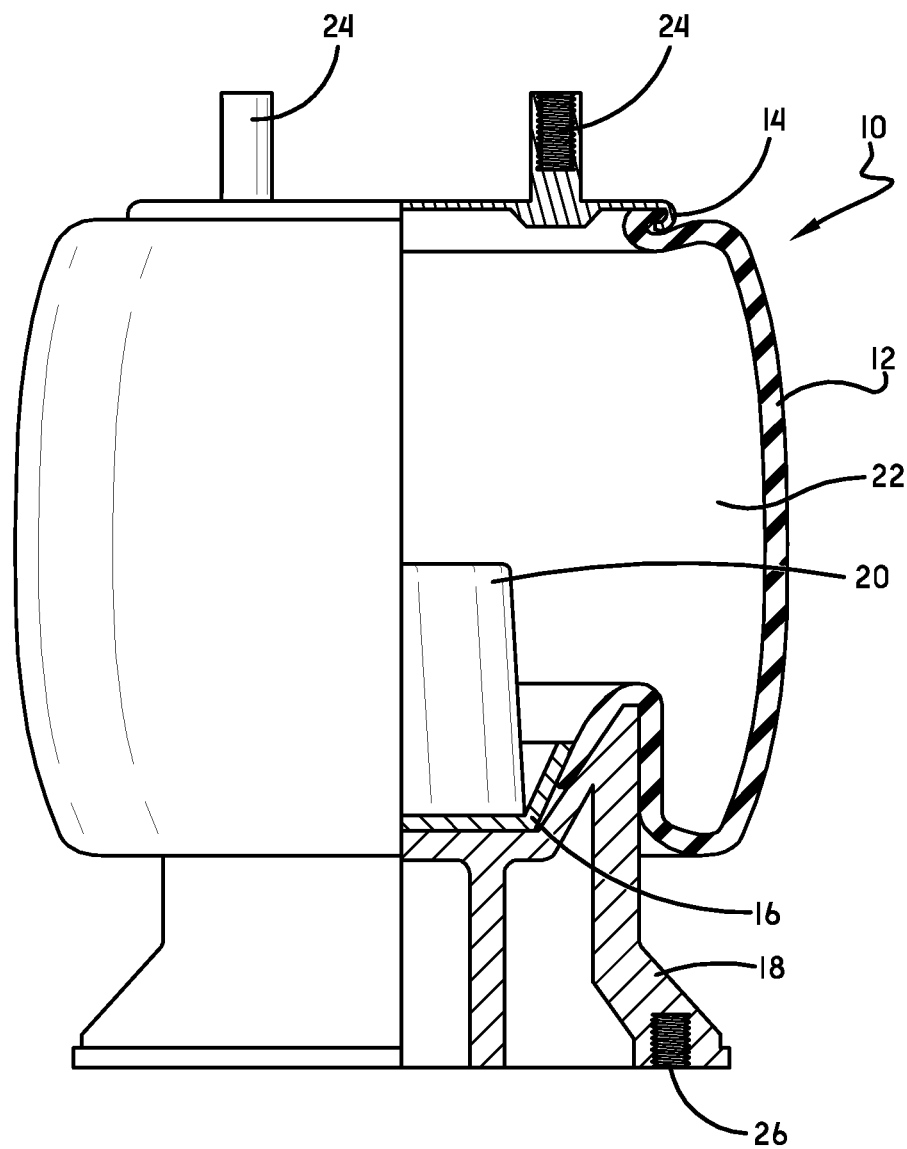
FIG. 1 is a perspective view of an exemplary air spring according to one or more embodiments of the present invention.
Figure 2:
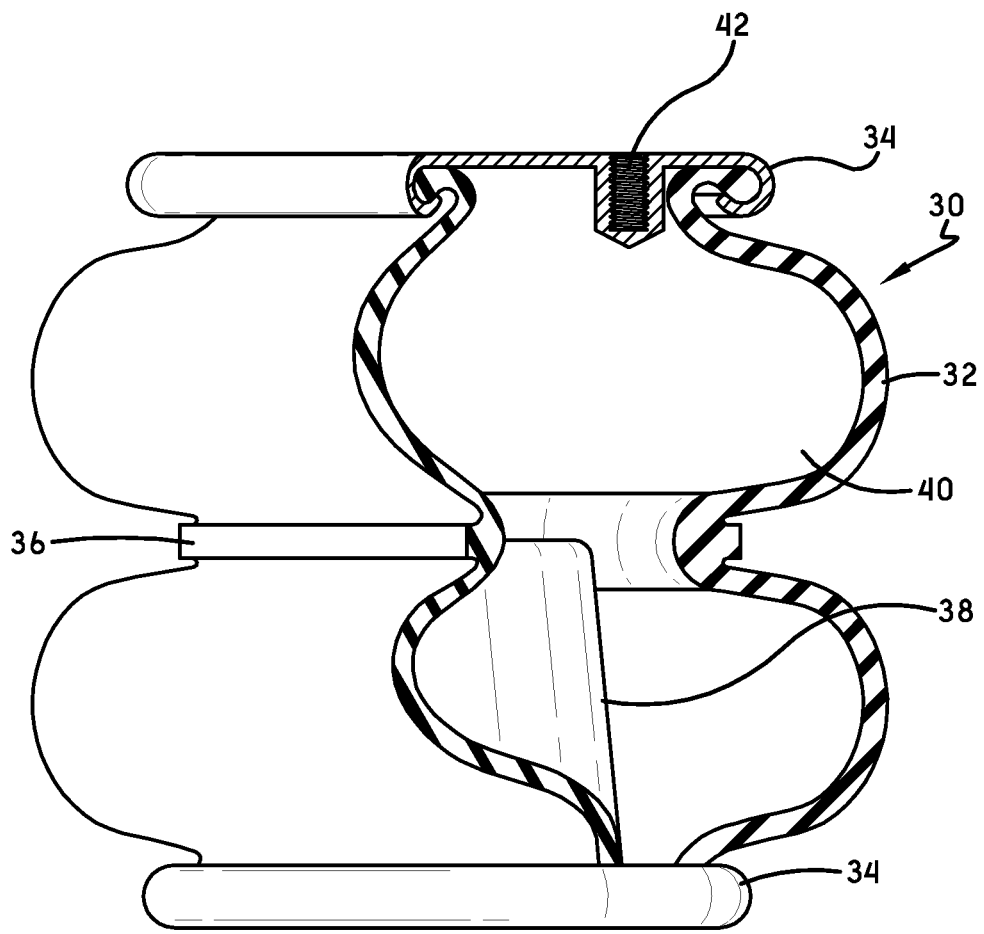
FIG. 2 is a perspective view of an exemplary air spring according to one or more embodiments of the present invention.

For example, FIGS. 1 and 2 show two typical designs of air springs. In FIG. 1, a flexible sleeve air spring assembly is designated generally by the numeral 10. Flexible sleeve air spring assembly 10 includes flexible airsleeve 12, which may also be referred as bellow 12. Bead plate 14 is crimped to airsleeve 12 to form an airtight seal between bead plate 14 and airsleeve 12. Similarly, end closure 16 is molded to flexible airsleeve 12 to form an airtight seal between end closure 16 and airsleeve 12. End closure 16 of airsleeve 12 is affixed to piston 18 by mechanical means well known in the art, including, for example, a piston bolt (not shown). Piston 18 provides a surface for flexible airsleeve 12 to roll on during compressive (jounce) travel. Flexible air spring assembly 10 may optionally include bumper 20 to support the vehicle when there is no air in the air springs or during extreme road disturbances. Enclosed within airsleeve 12 is a volume of gas 22. Studs 24 and hole 26 are used to secure the flexible air spring assembly 10 to the mounting surface of an automobile (not shown).

FIG. 2 shows a (double) convoluted air spring assembly designated generally by the numeral 30. Convoluted air spring assembly 30 includes flexible airsleeve 32. Bead plates 34 are crimped to airsleeve 32 to form an airtight seal between bead plates 34 and airsleeve 32. A girdle hoop 36 is affixed to airsleeve 32 between bead plates 34. Convoluted air spring assembly 30 may optionally include bumper 38 to support the vehicle when there is no air in the air springs or during extreme road disturbances. Enclosed within airsleeve 32 is a volume of gas 40. Blind nuts, including 42 and other blind nuts (not shown), are used to secure the convoluted air spring assembly 30 to the mounting surface of an automobile (not shown).

Figure 3:
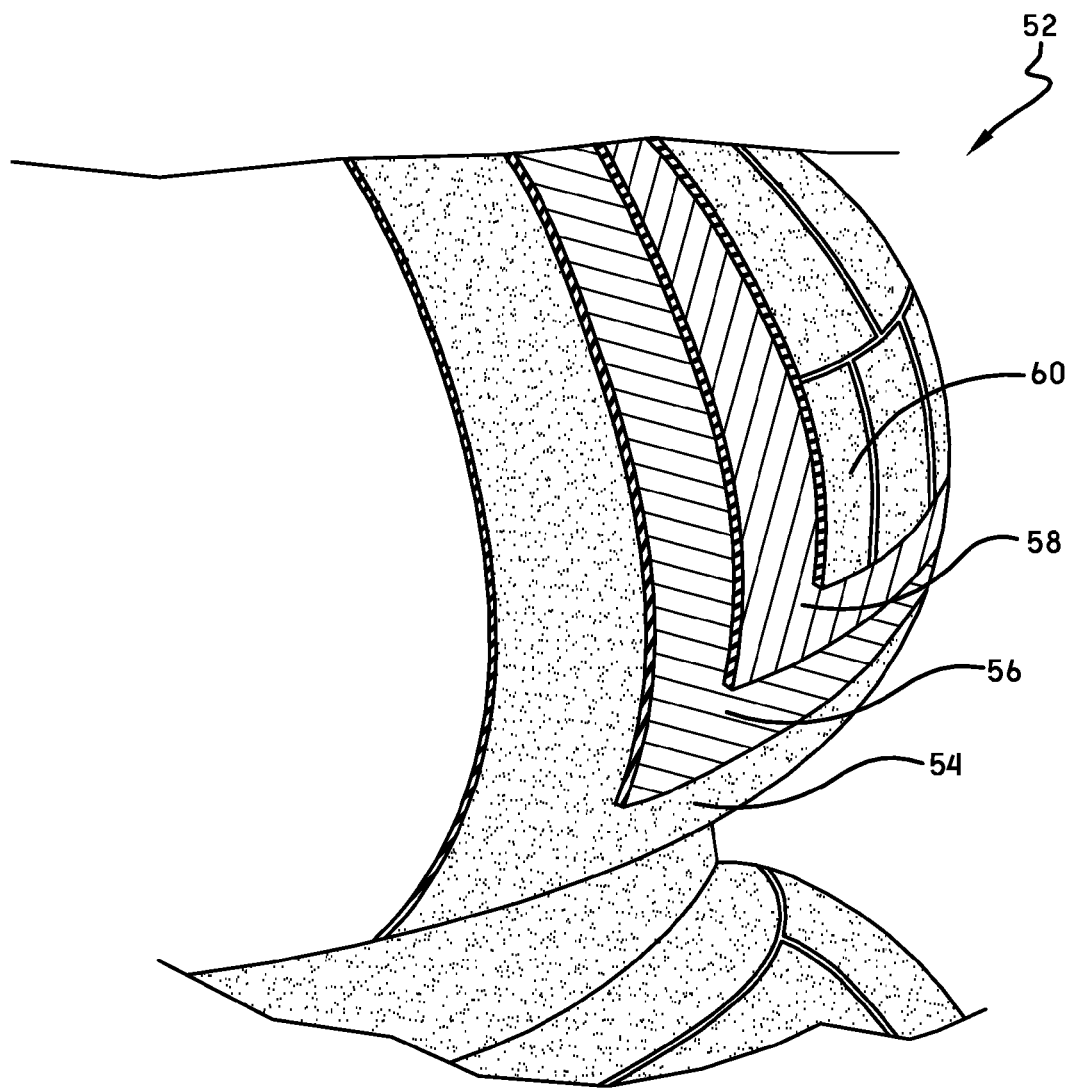
FIG. 3 is a cutaway view of an exemplary airsleeve showing its layered construction.

For both air spring assemblies 10 and 30, airsleeves 12 and 32 include one or more cord-reinforced (fabric or metal) rubber layers, as shown in a cutaway view of an exemplary airsleeve 52 in FIG. 3. Exemplary airsleeve 52 features "two-ply" construction and includes four layers including: innerliner 54, first ply 56, second ply 58, and outer cover 60. Innerliner 54 and outer cover 60 may include calendared rubber. First ply 56 includes a single ply of cord-reinforced rubber with the cords at a specific bias angle. Second ply 58 includes a single ply of fabric-reinforced rubber with the same bias angle laid opposite that of first ply 56.

In one or more embodiments, innerliner 54 and outer cover 60 may have a thickness of between 5 and 100 μm, in other embodiments between 10 and 90 μm, and in other embodiments between 20 and 80 μm. In these or other embodiments, the innerliner 54 and outer cover 60 may be characterized by a room temperature elongation (ASTM D-412) of at least 200%, in other embodiments at least 250%, and in other embodiments at least 300%.

While the present invention is described in the context of an airsleeve and an air spring used in the suspension of an automobile, one of skill in the art will appreciate that the teachings disclosed may be applied to other art relating to the air spring areas. The other areas might include, for example, air springs for seats, air springs used to support truck cabs, air springs used with buses, and the like.

One or more embodiments of the present invention are directed toward rubber compositions, which may also be referred to as vulcanizable compositions, that are useful in the manufacture of one or more layers of an airsleeve. These vulcanizable compositions include a vulcanizable rubber, non-ionic surfactant, and optionally other ingredients known to be included in rubber compositions for preparing one or more layers of an airsleeve. These rubber compositions may be fabricated and cured into airsleeves and ultimately assembled into air springs by employing techniques known in the art. In particular embodiments, the rubber compositions described herein are employed in the manufacture of the liner layer of an air sleeve. In other embodiments, the rubber compositions described herein are employed in the manufacture of a cover layer of an air sleeve. In other embodiments, both the liner and the cover are manufactured from the rubber compositions of the present invention. In yet other embodiments, the rubber compositions of the present invention are employed in the manufacture of the fiber-reinforced layer or layers. In yet other embodiments, the liner, the cover, and the fiber-reinforced layers are manufactured from the rubber compositions of the present invention.

In one or more embodiments, vulcanizable rubber, which may also be referred to as elastomer, includes those polymers that are capable of being cured (also referred to as vulcanized) to form elastomeric compositions of matter.

As those skilled in the art appreciate, exemplary polymers include natural rubber, synthetic polyisoprene, polybutadiene, polyisobutylene-co-isoprene, polychloroprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. In one or more embodiments, the vulcanizable rubber includes polychloroprene or polychloroprene copolymers, which may be referred to as neoprene. In particular embodiments, these vulcanizable rubbers include neoprene optionally blended with natural rubber. In other embodiments, the vulcanizable rubbers include a blend of "non-neoprene" elastomers. For example, the vulcanizable rubber may include a blend of natural rubber, styrene-butadiene copolymer rubber, poly(ethylene-co-propylene-co-diene) and butadiene rubber. The styrene-butadiene copolymer rubber may be characterized, for example, by including 20-25% styrene, have a cis content of about 10-20%, a vinyl content of about 10-20%, and a Mooney viscosity ($ML_{1+4}$@100° C.) of from about 45 to about 55. The butadiene rubber may be characterized by, for example, a vinyl content of less than 5%, a cis content in excess of 80%, a trans content of 15-25%, a glass transition temperature (Tg) of −90-100° C., and a Mooney viscosity ($ML_{1+4}$@100° C.) of 35-45.

In particular embodiments, the rubber includes polymers that derive from the polymerization of halogenated dienes and optionally monomer copolymerizable therewith. An example is 2-chloro-1,3-butadiene, which is also known as chloroprene. Monomer copolymerizable with chloroprene includes sulfur and 2,3-dichloro-1,3-butadiene. Homopolymers of chloroprene may be referred to as polychloroprene. For purposes of this description, the rubbers deriving from the copolymerization of chloroprene and monomer copolymerizable therewith may be referred to as polychloroprene copolymers.

In one or more embodiments, polychloroprene or polychloroprene copolymers employed in the practice of this invention may be characterized by a Mooney viscosity ($ML_{1+4}$ at 100° C.) of at least 25, in other embodiments at least 40, in other embodiments at least 60, in other embodiments at least 80, and in other embodiments at least 100. In these or other embodiments, the polychloroprene or polychloroprene copolymers may be characterized by a Mooney viscosity ($ML_{1+4}$ at 100° C.) of less than 150, in other embodiments less than 130, in other embodiments less than 110 in other embodiments less than 80, in other embodiments less than 60, and in other embodiments less than 50. In particular embodiments, the polychloroprene or polychloroprene copolymers may be characterized by a Mooney viscosity ($ML_{1+4}$ at 100° C.) of from about 100 to about 120, and in other embodiments from about 41 to about 51.

In one or more embodiments, blends of distinct polychloroprene or polychloroprene copolymers may be employed to achieve a desirable balance of properties. These distinctions may be based upon comonomer content and/or viscosity of the polymers.

Particularly useful examples of desirable polychloroprene or polychloroprene copolymers are available from DuPont Performance Elastomers (Wilmington, Del.) under the Neoprene™ "WD" and "WRT" family designations. It is believed that Neoprene™ WD and WRT are relatively crystallization-resistant, versus Neoprene™G-type, and are copolymers of chloroprene and 2,3-dichloro-1,3-butadiene. Neoprene™ WD exhibits a Mooney Viscosity range ($M_{1+4}$ at 100° C.) of 100-120, while Neoprene™ WRT exhibits a Mooney Viscosity range ($M_{1+4}$ at 100° C.) of 41-51.

In one or more embodiments, the non-ionic surfactant includes a polyoxyethylene alkyl ether, a polyoxyethylene derivative, a sorbitan fatty acid ester, a polyoxyalkylene alkyl ether, a polyoxyethylene sorbitan fatty acid ester, a polyoxyethylene sorbitol fatty acid ester, a glycerol fatty acid ester, a polyoxyethylene fatty acid ester, a polyoxyethylene alkyl amine, an alkylol amide, or mixtures of two or more thereof.

Specific examples of non-ionic surfactants include polyoxyethylene sorbitan monolaurate, polyoxyethylene sorbitan monopalmitate, polyoxyethylene sorbitan monostearate, polyoxyethylene soritan tristearate, polyoxyethylene sorbitan monooleate, polyoxyethylene sorbitan trioleate, polyoxyethylene sorbitan triisostearate, polyoxyethylene sorbitan monolaurate, polyoxyethylene sorbitol tetraoleate, or mixtures of two or more thereof.

In one or more embodiments, the non-ionic surfactant may be defined by the formula

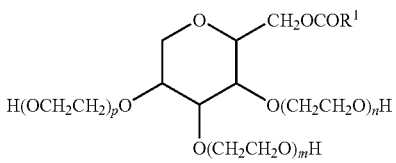

where $R^1$ is a monovalent organic group and m, n, and p are independently an integer from 1 to about 10. In particular embodiments, $R^1$ is an organic group including from about 15 to about 24 carbon atoms.

In one or more embodiments, the mono-valent organic groups may be hydrocarbyl groups such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl group. These hydrocarbyl groups may contain heteroatoms such as, but not limited to, nitrogen, oxygen, boron, silicon, tin, sulfur, and phosphorus atoms.

In other embodiments, the non-ionic surfactant may be defined by the formula

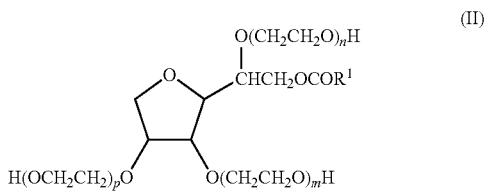

where $R^1$ is a monovalent organic group and m, n, and p are independently an integer from 1 to about 10.

In other embodiments, the non-ionic surfactant includes surfactants that are in liquid form at standard temperature and pressure. In particular embodiments, the non-ionic surfactant is a liquid and is delivered to the vulcanizable composition of matter on an inert carrier. In other embodiments, the non-ionic surfactant is a solid at room temperature.

In one or more embodiments, the non-ionic surfactant may include a polysorbate, such as a polyoxyethylene sorbitan fatty acid ester or a polyoxyethylene sorbitol fatty acid ester. Examples of liquid polysorbates include polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, and polyoxyethylene sorbitol tetraoleate.

In one embodiment, the non-ionic surfactant includes compounds that may be represented by the formula

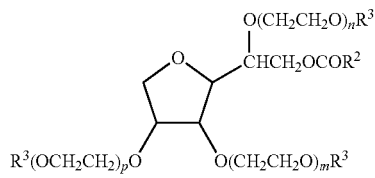

where $R^2$ is a monovalent organic group having a carbon number of from about 11 to about 24, where each $R^3$ is independently hydrogen or a group that may be represented by the formula $C(O)R^2$, and where m, n, and p are independently an integer from 1 to about 10. In one or more embodiments, $R^2$ is an alkyl or alkenyl group having a carbon number of from about 11 to about 24. In one or more embodiments, $R^2$ is an alkyl or alkenyl group having a carbon number of from about 11 to 14.

In one or more embodiments, the number average molecular weight of the non-ionic surfactant is less than about 2000 g/mole, in another embodiment, the number average molecular weight of the non-ionic surfactant is less than about 1500 g/mole, and in another embodiment, the molecular weight of the non-ionic surfactant is less than about 1300 g/mole. Number average molecular weight may be measured by conventional methods, including gel permeation chromatography with standards such as styrene.

Non-ionic surfactants are commercially available. For example, a polyoxyethylene sorbitan monolaurate is available from Lambent Technologies Corp. as Lumisorb™ PSMS-20 LK (Polysorbate 60).

In one or more embodiments, the non-ionic surfactant is characterized by an HLB value (which represents the balance between hydrophilic nature and lipophilic nature) of from about 2 to about 19, in other embodiments from about 3 to about 18, in other embodiments from about 4 to about 17, and in other embodiments from about 5 to about 15.

In addition to the foregoing ingredients, the vulcanizable compositions of this invention may also optionally include other additives including, but not limited to, factice, carbon black, silica, stearic acid, metal oxides, antioxidants, polyethylene wax, wax, plasticizers, or other desirable ingredients.

In one or more embodiments, plasticizers, which may also be referred to as softeners, include, but are not limited to, fatty acids, vegetable oils, petroleum products, coal tar products, pine products, esters, and resins. In particular embodiments, the plasticizers include esters such as dicapryilphthalate, butylcuminate, dibutylphthalate, butyllactate, glycerol chlorobenzoate, methylricinoleate, octyloleate, dioctylphthalate, or dioctylsebacate.

In one or more embodiments, factices include vulcanized oils. Factices may permit higher liquid plasticizer levels. Factices may also speed the incorporation of fillers and increase milling efficiency. A suitable factice is commercially available from Akrochem Corporation (Akron, Ohio) under the Akrofax tradename.

Useful carbon blacks include reinforcing and non-reinforcing carbon blacks. For example, useful carbon blacks include those conforming to the characteristics of ASTM 300 series, 500 series, 600 series, or 900 series (e.g., ASTM N550, ASTM N330, ASTM N990), or blends thereof.

Useful forms of silica (silicon dioxide) include crystalline and amorphous silica. The crystalline form of silica includes quartz, tridymite and cristobalite. Amorphous silica may occur when the silicon and oxygen atoms are arranged in an irregular form as identified by X-ray diffraction. In one or more embodiments, the silica is a precipitated silica. In these or other embodiments, fumed silica is employed. Commercially available forms of silica are available from PPG Industries, Inc. (Monroeville, Pa.), Degussa Corporation (Parsippany, N.J.) and J.M. Huber Corporation (Atlanta, Ga.). One useful commercial product is Rubbersil® RS-150, which is characterized by a BET surface area of 150 m²/g, tapped density of 230 g/liter, pH (5% in water suspension) of 7, $SiO2$ content of 98%, $Na_2SO_4$ content of 2%, and $Al_2O_3$ content of 0.2%.

In one or more embodiments, the vulcanizable composition of this invention may include metal oxides, such as magnesium oxide (MgO) or zinc oxide (ZnO). Metal oxides may be used to neutralize trace hydrogen chloride that may be liberated by the polymer during processing, vulcanization, heat aging, or service. Metal oxides may also take part in the crosslinking process by speeding the rate of reaction of elemental sulfur with the unsaturation of the rubber.

In one or more embodiments, the vulcanizable composition of this invention includes a curative or cure package. The cure package may include a sulfur-based compound and may also include other optional ingredients. Although one having skill in the art may appreciate other possible cure packages, an exemplary cure package includes sulfur, TMTD, zinc oxide, Vulkanox MB2 (AO2), and IPPD.

Sulfurs that are soluble or insoluble in elastomers may be used. Exemplary sulfur is Crystex OT 20, polymeric sulfur that is insoluble in elastomers. At vulcanization temperatures, Crytex OT 20 de-polymerizes to soluble sulfur and behaves similarly to what is traditionally known as "rubber maker's sulfur" and fosters the crosslinking of polymer molecules. Crystex OT 20 is commercially available from Flexsys (Akron, Ohio).

TMTD, or tetramethylthiuram disulfide, is a cure accelerant that increases the rate of cure by catalyzing the addition of sulfur chains to the rubber molecules.

Zinc oxide may act as a cure activator in the presence of sulfur, one or more accelerators, and unsaturated rubber to help promote the formation of sulfur cross-links during the vulcanization process.

In one or more embodiments, the vulcanizable compositions employed in practicing the present invention include a sufficient amount of vulcanizable rubber so as to achieve a technologically useful airsleeve of an air spring. In one or more embodiments, the overall vulcanizable composition of matter includes at least 35% by weight, in other embodiments at least 40% by weight, and in other embodiments at least 45% by weight vulcanizable rubber. In these or other embodiments, the overall vulcanizable composition of matter includes less than 99%, in other embodiments less than 90%, and in other embodiments less than 75% by weight vulcanizable rubber. In one or more embodiments, at least 80%, in other embodiments at least 90%, and in other embodiments at least 95% of the rubber component of the vulcanizable composition comprises polychloroprene or polychloroprene copolymers.

In one or more embodiments, the vulcanizable composition of this invention includes at least 0.5 parts by weight, in other embodiments at least 1.0 parts by weight, and in other embodiments at least 1.5 parts by weight (pbw) of non-ionic surfactant per 100 parts by weight rubber. It will be understood that parts by weight of the component per 100 parts by weight of total rubber can be referred to as phr. In one or more embodiments, the vulcanizable compositions include less than 10 pbw, in other embodiments less than 8 pbw phr, in other embodiments less than 6 pbw phr, and in other embodiments less than 4 pbw non-ionic surfactant phr.

In one or more embodiments, the vulcanizable composition may include at least 5, in other embodiments at least 8, and in other embodiments at least 10 pbw plasticizer phr. In these or other embodiments, the vulcanizable composition may include less than about 30, in other embodiments less than about 25, and in other embodiments less than about 20 pbw plasticizer phr. In particular embodiments, the non-ionic surfactant serves as a complete replacement for a plasticizer and therefore the vulcanizable compositions are devoid or substantially devoid of plasticizer. In other embodiments, the vulcanizable compositions of this invention include less than 3 parts, in other embodiments less than 1 part, and in other embodiments less than 0.1 pbw plasticizer (e.g., esters) phr. In certain embodiments, the composition of this invention may include an oil (e.g., petroleum oil) but are otherwise devoid or substantially devoid of plasticizer (e.g., esters).

In certain embodiments, the vulcanizable composition of this invention is devoid of factice. In one or more embodiments, the vulcanizable composition may include at least about 2, in other embodiments at least about 4, and in other embodiments at least about 8 pbw factice phr. In one or more embodiments, the vulcanizable composition may include less than about 20, in other embodiments less than about 15, and in other embodiments less than about 12 pbw factice phr.

In one or more embodiments, the vulcanizable composition may include at least 20, in other embodiments at least 30, and in other embodiments at least 40 pbw carbon black phr. In one or more embodiments, the vulcanizable composition may include less than 100, in other embodiments less than 75, and in other embodiments less than 50 pbw carbon black phr.

In one or more embodiments, the vulcanizable composition may include at least 15, in other embodiments at least 20, and in other embodiments at least 25 pbw silica phr. In one or more embodiments the vulcanizable composition may include less than 250, in other embodiments less than 200, in other embodiments less than 90, and in other embodiments less than 80 pbw silica phr. Where both carbon black and silica are employed, the weight ratio of carbon black to silica may range from 9:1 to 0.5:1, in other embodiments from 5:1 to 1:1, and in other embodiments from 4:1 to 2:1.

Those skilled in the art will be able to select an appropriate amount of the various ingredients that can be used based upon the ultimate desired properties sought within the airsleeve of an air spring. Likewise, those skilled in the art will be able to select an appropriate amount of curative and complementary cure agents in order to achieve a desired level of cure.

The compositions for preparing one or more layers of an airsleeve according to the present invention can be prepared by conventional means using conventional rubber compounding equipment such as Brabender, Banbury, Werner-Pfleiderer, Sigma-blade mixer, two-roll mill, or other mixers suitable for forming viscous, relatively uniform admixtures. Mixing techniques depend on a variety of factors such as the specific types of polymers used, and the fillers, processing oils, waxes, and other ingredients used. In one or more embodiments, the ingredients can be added together in a single stage. In other embodiments, some of the ingredients such as non-ionic surfactant, carbon black, etc. can be first loaded followed by the rubber. In other embodiments, a more conventional manner can be employed where the rubber is added first followed by the other ingredients. In even other embodiments, the rubber may be added at the same time as the non-ionic surfactant.

Mixing cycles generally range from about 2 to 10 minutes. In certain embodiments, an incremental procedure can be used whereby the rubber and part of the ingredients are added first, and the remaining ingredients are added in additional increments. In other embodiments, part of the rubber can be added on top of the other ingredients. In other embodiments, the rubber and non-ionic surfactant are added together. In one or more embodiments, two-stage mixing can be employed.

The non-ionic surfactant can be added with the rubber near the beginning of the mixing cycle. (e.g., in the masterbatch) In one or more embodiments, the non-ionic surfactant is added before the cure package is added. In other embodiments, the non-ionic surfactant can be added with the cure package during final mix.

When utilizing an internal mixer, the dry or powdery materials such as the carbon black can be added first, followed by the processing aids and finally the rubber to form the masterbatch. The cure package (sulfur, accelerants, antidegredants, etc.) can be added near the end of the mixing cycle and at lower temperatures to prevent premature crosslinking of the rubber Once mixed, the rubber composition can be then formed into a sheet via calendaring or combined with a reinforcing cord-(fabric or metal). The compositions of the invention can also be formed into various types of articles using other techniques such as extrusion.

The vulcanizable rubber compositions of the present invention can be formed into airsleeves of air springs by employing conventional techniques for fabricating and manufacturing air springs. Air spring and air sleeve constructions and methods of their manufacture are known in the art as exemplified in U.S. Pat. Nos. 7,250,203, 5,527,170, and 6,439,550, which are incorporated herein by reference.

In order to demonstrate the practice of the present invention, the following examples have been prepared and tested. The examples should not, however, be viewed as limiting the scope of the invention. Accordingly, for an appreciation of the true scope and breadth of the invention, reference should be made to the following claims.

What is claimed is:

1. An air spring having an airsleeve, wherein at least one layer of said airsleeve includes
   a vulcanized elastomer; and
   a non-ionic surfactant.

2. The air spring of claim 1, wherein said elastomer includes polychloroprene or polychloroprene copolymers.

3. The air spring of claim 2, wherein said polychloroprene copolymer is a copolymer of chloroprene and 2,3 dichloro-1,3-butadiene.

4. The air spring of claim 3, wherein said copolymer has a Mooney Viscosity ($ML_{1+4}$ at 100° C.) of 100-120.

5. The air spring of claim 1, where the elastomer includes a blend of natural rubber, styrene-butadiene copolymer rubber, and butadiene rubber.

6. The air spring of claim 1, where the non-ionic surfactant is selected from the group consisting of polyoxyethylene alkyl ether, a polyoxyethylene derivative, a sorbitan fatty acid ester, a polyoxyalkylene alkyl ether, a polyoxyethylene sorbitan fatty acid ester, a polyoxyethylene sorbitol fatty acid ester, a glycerol fatty acid ester, a polyoxyethylene fatty acid ester, a polyoxyethylene alkyl amine, an alkylol amide, and mixtures of two or more thereof.

7. The air spring of claim 1, where the non-ionic surfactant is selected from the group consisting of polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate, polyoxyethylene sorbitan trioleate, polyoxyethylene sorbitan triisostearate, polyoxyethylene sorbitol tetraoleate, or mixtures of two or more thereof.

8. The air spring of claim 1, where the non-ionic surfactant is defined by the formula

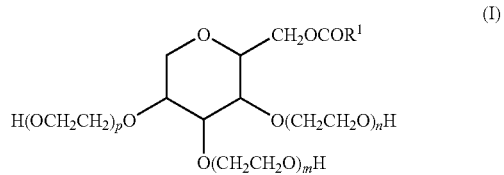

(I)

where $R^1$ is a monovalent organic group and m, n, and p are independently an integer from 1 to about 10.

9. The air spring of claim 1, where the non-ionic surfactant is defined by the formula

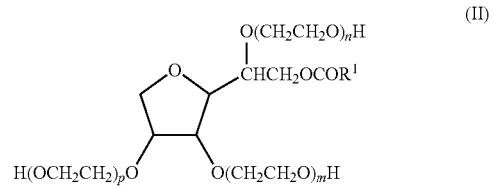

(II)

where $R^1$ is a monovalent organic group and m, n, and p are independently an integer from 1 to about 10.

10. The air spring of claim 1, where the non-ionic surfactant is defined by the formula

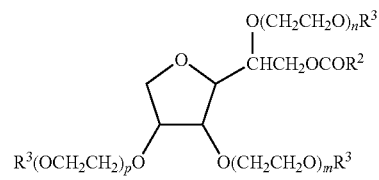

where $R^2$ is a monovalent organic group having a carbon number of from about 11 to about 24, where each $R^3$ is independently hydrogen or a group that may be represented by the formula $C(O)R^2$, and where m, n, and p are independently an integer from 1 to about 10.

11. A method for the production of an air spring airsleeve comprising:
   mixing a rubber, non-ionic surfactant, and a curative to form a green compound;
   forming the green compound into the shape of an airsleeve; and
   curing the green compound, to thereby form an airsleeve wherein at least one layer of the airsleeve includes a vulcanized elastomer and a non-ionic surfactant.

* * * * *